July 24, 1962 P. G. CATH ETAL 3,046,355

IMPULSE TRANSMITTING MECHANISM

Filed Dec. 30, 1957 3 Sheets-Sheet 1

INVENTORS P. G. CATH
W. PFERD
BY
[signature]
ATTORNEY

July 24, 1962 P. G. CATH ET AL 3,046,355

IMPULSE TRANSMITTING MECHANISM

Filed Dec. 30, 1957 3 Sheets-Sheet 2

INVENTORS P. G. CATH
W. PFERD

BY

ATTORNEY

July 24, 1962 P. G. CATH ETAL 3,046,355

IMPULSE TRANSMITTING MECHANISM

Filed Dec. 30, 1957 3 Sheets-Sheet 3

INVENTORS P. G. CATH
W. PFERD

BY

ATTORNEY

United States Patent Office 3,046,355

Patented July 24, 1962

3,046,355

IMPULSE TRANSMITTING MECHANISM

Pieter G. Cath, Plainfield, and William Pferd, Watchung, N.J., assignors to Bell Telephone Laboratories, Incorporated, New York, N.Y., a corporation of New York Filed Dec. 30, 1957, Ser. No. 705,996
2 Claims. (Cl. 179—90)

This invention relates to an impulse transmitting mechanism of the rotary dial type and more particularly to a device intended for installation at public telephone stations in which a pair of dial mechanisms are operatively connected together to provide means for transmitting a series of impulses over the coin box circuit, for emergency service, without the deposit of a coin.

The structure of the invention contemplates the provision of a pair of dial mechanisms of the type shown in Patent 2,563,581 to H. R. Clarke et al., August 7, 1951, mechanically coupled together to provide a unitary structure, wherein one mechanism is used to provide a time delay for conditioning the equipment at the central office, prior to the operation of the second dial mechanism, which performs the switching dial function, thereby preventing the fraudulent operation of the dial.

One of the objects of this invention is to provide a dialing mechanism which in an emergency may be operated to send out a predetermined set of impulses over the standard pay telephone station circuit without the deposit of a coin.

Another object of the invention is the provision of an impulse transmitting device wherein only a predetermined set of impulses can be sent out thereby preventing fraudulent operation of the device.

In public telephone stations of the prepay type, in common use today, it is necessary to deposit a coin or token in order to initiate a call or to signal the central office. There is no provision for initiating an emergency call without depositing a coin. For example, when the customer removes the handset from the switchhook a talking loop is closed, but no signal is transmitted to the central office. The line relay at the central office operates only after a path to ground has been established through the coin relay and a hopper trigger contact. The hopper trigger contact is closed by the deposit of coins thus causing the operation of the line relay which results in dial tone being placed on the line after which the customer may proceed with the dialing of the desired number or code.

When using the emergency dial mechanism of this invention, which is an adjunct to the regular calling dial and not a replacement, a similar procedure is followed except that the ground connection of the line is not made by the deposit of a coin or coins but by means of a contact associated with the emergency dial mechanism.

To place an emergency call, the customer immediately operates the emergency dial upon the removal of the handset from the switchhook. Upon the operation of the emergency dial by the rotation of the fingerwheel having a single aperture, dial tone is placed on the line and the customer is able to hear this tone. The mechanism of the emergency dial is such that the impulses to the central office are transmitted approximately two seconds after the ground connection has been established on the line or about the time it takes the fingerwheel to return to its normal position. After the fingerwheel has returned to its normal position, the impulse transmitting mechanism will send out the desired impulses. Thus, in an emergency, it is only necessary for the customer to lift the handset from the switchhook, rotate the single apertured fingerwheel to the stop which sets in motion the mechanism which establishes a line connection to the central office and puts dial tone on the line without the deposit of a coin.

The invention will be clearly understood from the following detailed description when read in connection with the following drawings, in which.

Figure 1:
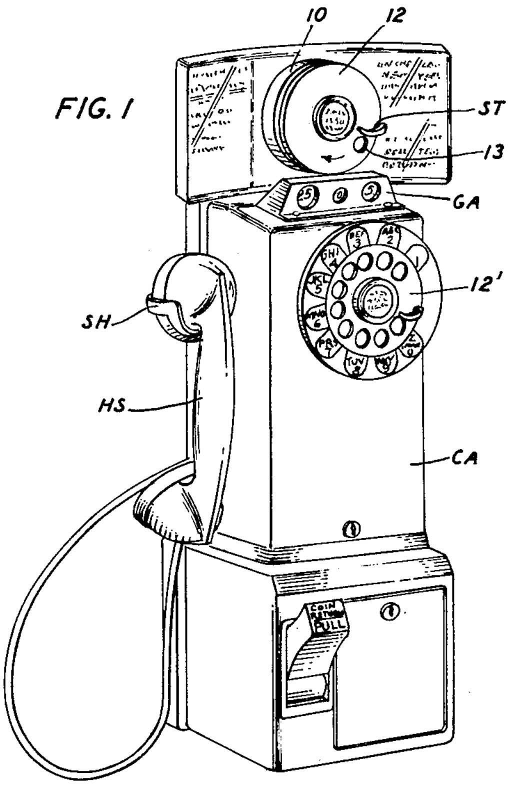
FIG. 1 is a view in perspective of a coin telephone pay station with the emergency dial of this invention mounted on the top of the casing to the rear of the coin gauge.
Figure 2:
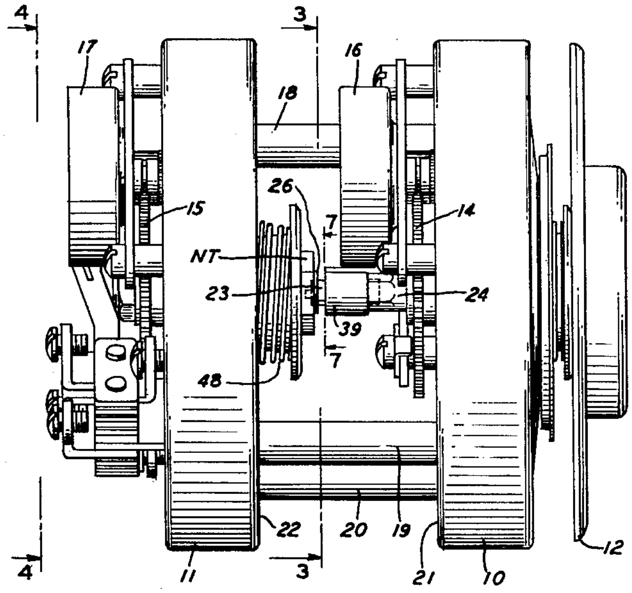
FIG. 2 is a side elevational view of the dial of this invention illustrating the coupling of the two mechanisms.

The invention as disclosed in the various figures of the drawings and with particular reference to FIG. 2, comprises a pair of dial mechanisms, which for the sake of clarity, will be designated outer dial 10 and inner dial 11. As shown in FIG. 1, the dial mechanism is an adjunct to the regular calling dial and is mounted atop the coin box telephone casing CA behind the coin gauge GA.

The inner dial 11 is a standard type of calling dial as shown and described in Patent 2,563,581 to H. R. Clarke et al., August 7, 1951, but minus the fingerwheel and number plate. The outer dial 10 is substantially the same as the inner dial 11 except that the pulsing mechanism has been omitted and a fingerwheel 12, having a single finger aperture 13, has been provided together with a suitable fingerwheel stop ST. The location of the aperture 13 corresponds to the position ordinarily associated with the operator's designation.

The dials 10 and 11 are of the well known rotary type as heretofore referred to and since the mechanisms of these dials per se form no part of our invention no further description of them is believed necessary other than to state that they comprise the usual gear train which includes the gears 14 and 15 with which the invention is concerned, the functions of which will be described in detail later, and the usual governors 16 and 17 operatively associated therewith.

The dials 10 and 11 as shown in FIG. 2 are mounted in spaced relation by means of the spacer bars 18, 19 and 20 which are secured to the inner face 21 of the dial 10 and the outer face 22 of dial 11, thereby maintaining the dials in juxtaposition with respect to each other. The dials 10 and 11 as shown, are mechanically interconnected or coupled together by means of a tongue member 23 on the drive shaft 24 of the dial 10 which engages a slot 25 on the end of the drive shaft 26 of the dial 11 adjacent the nut NT. A coupling 39 interposed between the two dials and connected to the shafts thereof permits free wheeling of the outer dial mechanism in one direction only; thus both dials can wind up together run down independently.

Figure 3:
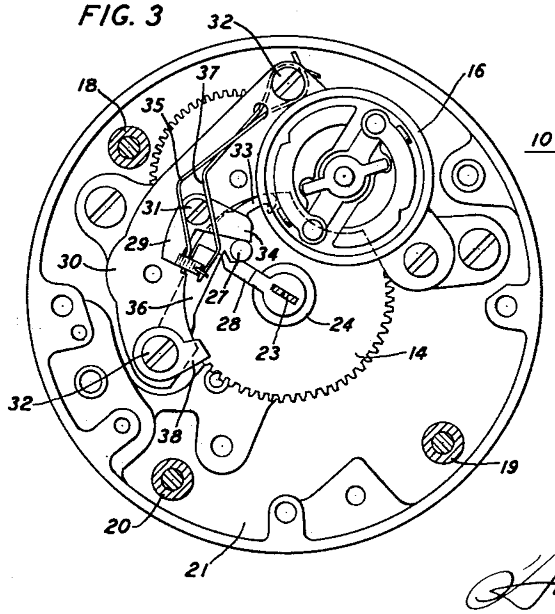
FIG. 3 is a bottom view taken on line 3—3 of FIG. 2 in the direction of the arrows and illustrates the mechanism of the outer dial and its associated fingerwheel.
Figure 8:
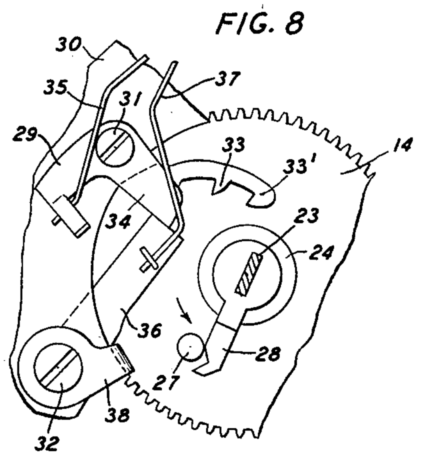
FIG. 8 is an enlarged fragmentary view of the latch mechanism and its associated gear wheel showing the relative position thereof when the gear has been rotated part way on its normal wind-up stage.
Figure 9:
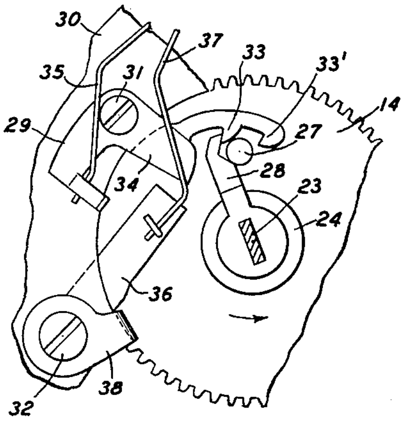
FIG. 9 is a view similar to FIG. 8 but illustrates the gear wheel and its associated parts latched up at the completion of the wind-up stage prior to its being released by the return to normal of the fingerwheel.

As shown in FIGS. 3, 8 and 9, the gear 14 has mounted on its outer face an extending stud 27, which is operatively associated with the notched lever arm 28 which is secured to and extends at right angles from a shaft 24 and with the pawl member 29. The pawl 29 is pivotally mounted on the screw 31 located on the raised plate 30 which is secured to the face 21 by means of the screws 32—32 and is provided with an extending arcuate latch portion 33 and 33'. In the normal position of the outer dial mechanism 10 as shown in FIG. 3, the stud 27 on the gear 14 is in engagement and bears against the arm 28 due to the normal action of the wind-up spring of the inner dial. The action of this spring is well known in the calling dial art to rotate the fingerwheel and associated mechanism to send out the impulses after it has been wound up and the fingerwheel released.

As shown in FIG. 3 of the arm 34 the pawl 29 is in engagement with the stud 27 and is held thereagainst by means of the spring 35 with the latch portion 33, also by virtue of this spring, held in operative position. There is also shown in this figure, in its normal position, a dog member 36. This dog normally rests against the end of the arm 28 and is held in position by means of the spring 37. A suitable stop 38, mounted on the face plate 30 under the screw 32, is provided to limit the movement of the dog 36.

From the foregoing it will be readily observed that when the fingerwheel 12 which is operatively connected to the gear 14, is rotated in its wind-up stage (i.e., in the direction of the arrow), the stud 27 on the gear 14, will cause the arm 28 to rotate. This action permits the pawl 29, under the influence of the spring 35, to rotate. This action also permits the dog 36 to be released from the arm 28 and to be moved into engagement with the stop 38 under the influence of the spring 37, as shown in detail in FIG. 8. Thus the arm 34 of the pawl 29, with its associated latch portions 33 and 33', will come to rest on the upper portion of the dog 36 as shown in FIG. 8.

As shown in FIG. 9, the continued rotation of the fingerwheel 12 causes the stud 27 and the gear 14 to carry the arm 28 around until the latch portions 33 and 33' engage the notched end of the arm thereby preventing the rotation of the shafts 24 and 26 until the fingerwheel has returned to its normal position and the stud 27 has kicked the pawl 29 and its associated latch 33 and 33' out of engagement with the arm 28, thereby permitting the rotation of the shaft 26 of the inner dial and the actuation of the pulsing mechanism, on the inner dial 11, connected thereto. Just before the stud 27 disengages the latching mechanism 29—33, it is locked behind dog 36 which prevents the operation of the fingerwheel of the outer dial 10, while the inner dial 11 is pulsing.

It will thus be observed that a suitable lapse of time is provided from the time the fingerwheel 12 is released until the inner dial mechanism sends out its impulses.

How the outer dial cooperates with the inner dial to store up energy to send out the impulses by the inner dial and to delay the sending of such impulses until the outer dial has returned to normal, thus preventing fraudulent operation of the mechanism, will be described later on in the specification.

As heretofore described with respect to the outer dial mechanism 10, this dial is devoid of electrical contacts and consequently does not send out any electrical impulses but serves only to condition and prepare the calling dial 11 which we have designated the inner dial, to send out a series of impulses after a predetermined time has elapsed after the fingerwheel 12 and its associated mechanism has returned to normal.

Figure 7:
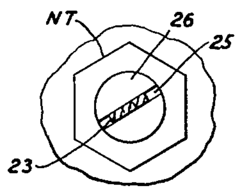
FIG. 7 is a fragmentary view showing the method of connecting the inner and outer dials together.
Figure 4:
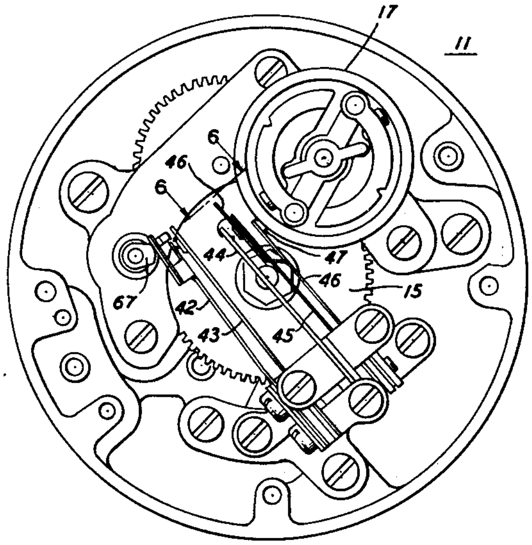
FIG. 4 is a bottom view taken on line 4—4 of FIG. 2 in the direction of the arrows and shows the contacts and mechanism of the inner dial in normal position.
Figure 6:
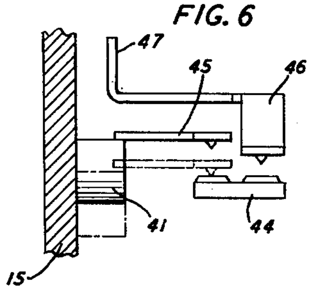
FIG. 6 is an enlarged fragmentary view showing in dot and dash, the normal and operative positions of the contacts operated by the stud on the gear of the inner dial.
Figure 5:
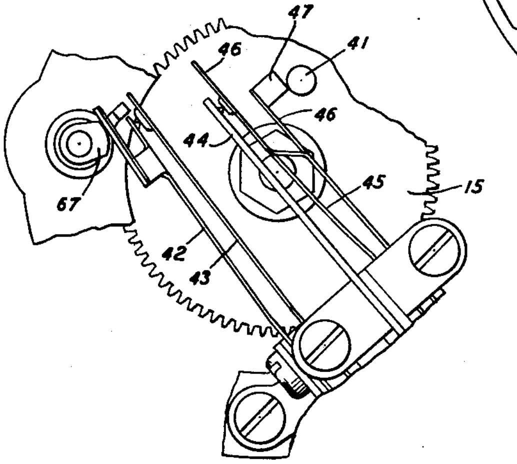
FIG. 5 is an enlarged fragmentary view with parts broken away showing the contact arrangement of the inner dial in detail.

As heretofore described and as shown in the drawings, the outer dial 10 and the inner dial 11, are mechanically interconnected or coupled, by means of a suitable free wheeling coupling arrangement 39 on the shaft 24 which cooperates with the shaft 26 on the inner dial as shown in FIGS. 1 and 7.

The inner dial 11 comprises a slightly modified standard calling dial of the well known type and is equipped with the usual wind-up spring 40, the necessary gears and suitable contacts associated therewith.

The usual fingerwheel and number plate have been dispensed with on the inner dial 11 and as shown the drive shaft 26 of this dial is mechanically coupled to the shaft 24 of the dial 10 as heretofore explained. The rotation of the fingerwheel 12 causes the mechanisms of both dials to be operated to wind up their respective springs to store energy for the return of their mechanisms to normal. This wind-up action causes energy to be stored in each dial mechanism for a separate and distinct purpose, i.e., in the outer dial 10 to return the fingerwheel to normal thereby releasing the pulsing mechanism of the inner dial after a predetermined time interval and in the inner dial 11 to send out the electrical impulses. The contacts on the inner dial 11 are those usually associated with this type of dial and operate in a similar manner except that whereas in a regular pay telephone station a coin must be deposited to establish a connection with the central office, the rotation of the outer dial 10 of this invention performs this function and permits the inner dial 11 to transmit the necessary impulses after the line has been conditioned by the operation of the outer dial 10.

After the handset HS has been removed from the switchhook SH, a talking loop is completed by the switchhook contact. However, no signal is sent to the central office.

The outer dial 10 and the inner dial 11 are mechanically coupled together. Hence when the customer winds up the fingerwheel 12, connected to the outer dial 10, both mechanisms are wound at the same time. Thus, when the fingerwheel 12 leaves its normal position, the inner dial 11 also leaves its normal position and the dial off normal contact springs 44 and 45 are operated by virtue of the stud 41 leaving spring 45. The dial off normal contacts thus short the coin telephone and prevent fraud either by the manipulation of the fingerwheel 12' of the normal dial telephone or the switchhook SH.

The continued rotation of the fingerwheel 12 causes the stud 41 to engage the tab 47 of the contact spring 46 thereby establishing contact between springs 46 and 44 in order to establish connection between the $R_1$ and T conductors to ground, which conditions the central office equipment, and remains closed as long as the finger 28 is engaging the latch 33.

After the release of the fingerwheel 12, the mechanism of the outer dial 10 returns to its normal position. The time it takes this dial to return to normal may be regulated by the adjustment of the governor 16. While the dial 10 is returning to normal, the dial 11 remains in its wound up position since it is locked up by the latch 33 and is released only when the dial 10 has returned to normal, as heretofore described.

When the inner dial 11 has been released, the ground contacts 44 and 46 are opened and the operator is dialed by means of the pulsing contacts 42 and 43 operated by the cam 67 through the gear mechanism and associated drive spring 48 operatively connected thereto. It will be noted that while the outer dial 10 is returning to normal the contact to ground remains closed.

Figure 10:
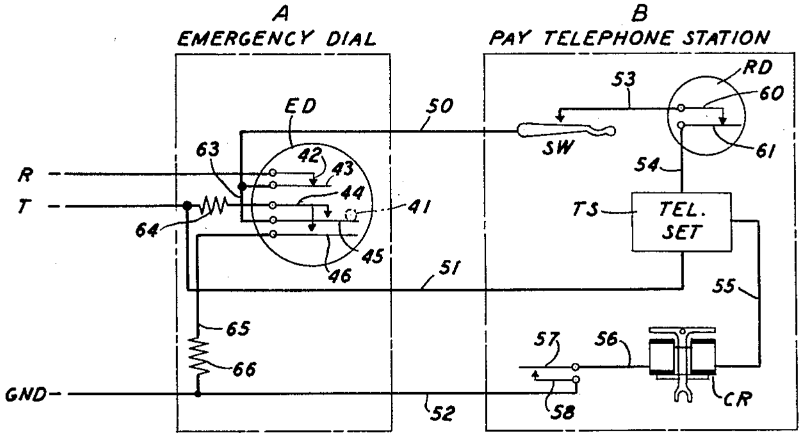
FIG. 10 is the schematic diagram showing the circuit of the dial mechanism of this invention and its application to the well known pay telephone station.

In the schematic circuit diagram as shown in FIG. 10, the enclosure A represents the emergency dial and B represents the standard pay telephone station.

As shown the conductors T and R represent the line to the central office and the conductor *Gnd* represents the circuit to ground. The conductors 50, 51 and 52 represent the connections between the emergency dial ED and the pay telephone station. In the enclosure B, SW represents the standard switchhook with its contact normally open as shown. RD is the standard calling dial connected thereto over conductor 53. The telephone set TS is connected to the dial RD over conductor 54, to the emergency dial ED over conductor 51 and to the coin relay over conductor 55. The coin relay CR is connected to ground over the conductor 56 through the contacts 57 and 58 to conductor 52.

Thus the above-described circuit may be traced as follows:

When the handset (not shown) is removed from the switchhook SW, a circuit is established from the R conductor through contacts 42 and 43 over conductor 50, through the contact on the switchhook SW, over conductor 53 through contacts 60 and 61 on the dial RD over conductor 54 to the telephone set TS; from the telephone set TS over conductor 55, through coin relay CR, thence over conductor 56 to hopper trigger contact 57. When no coin is deposited, as in placing an emergency call, in accordance with the structure of this invention contacts 57 and 58 are open as shown and no circuit to ground is established, thereby preventing the placement of a call except by the use of the emergency dial ED.

The emergency dial ED as heretofore described in the detailed description of the present invention completes the circuit as follows:

The rotation of the fingerwheel 12 in the wind-up direction to the finger stop ST, causes the contacts 44 and 45 to close thereby closing the loop between the T and R conductors through contacts 42 and 43 over the conductor 63 through the contacts 45 and 44, from the contact 44 through resistance 64 to the tip side T of the line.

Upon completion of the wind up a circuit is established between the conductor R and ground conductor *Gnd* through contacts 45, 44 and 46, over conductor 65 and through resistance 66. The circuit path from the conductor R to ground completes the start circuit for the central office recognizing a demand for service by bypassing the coin operated contacts 57 and 58 thus completing the wind-up stage. Upon release of the fingerwheel 12, the foregoing circuit is maintained until the fingerwheel returns to normal and operates the pawl 29 and its associated apparatus thereby permitting the inner dial 11 to return to normal under the influence of the spring 48. When the inner dial is released the ground contacts 44 and 46 are opened and contacts 42 and 43 pulse the line the required number of times to operate the central office equipment to complete the call.

The double latch 33 and 33' as shown in FIGS. 3, 8 and 9 prevents fraud by locking up the arm 28 in the pawl 29 before the contacts 44 and 46 operate.

When the inner dial has returned to normal or has completed its rundown, the contacts 44 and 45 will re-open thereby restoring the line to normal.

From the foregoing description with regard to the mechanism of this invention and the circuit therefor, it is readily apparent that the applicants have provided an emergency dialing means for establishing a telephone connection from pay telephone stations to a single predetermined station which may be operated without depositing a coin but is fraud proof in operation since it only permits a single predetermined code to be transmitted.

While we have shown and described the preferred embodiment of our invention, it is to be understood that various changes and modifications may be made therein without departing from the spirit of the invention and it is our intention to be limited only by the scope of the appended claims.

What is claimed is:

1. An impulse transmitter comprising inner and outer dial mechanisms, said dial mechanisms coaxially aligned in spaced relation, a shaft operatively connecting said mechanisms together to provide a unitary structure, a finger-wheel having a single finger aperture, connected to said shaft and in juxtaposition with respect to said outer dial mechanism, a pawl and latch mechanism, a set of pulsing contacts operatively associated with said inner dial mechanism, means associated with the outer dial mechanism for causing said dial mechanisms to operate simultaneously when said finger-wheel is rotated in a clock-wise direction, but permitting the outer dial mechanism to return to its normal position prior to the start of the run down of the inner dial mechanism and the subsequent operation of said pulsing contacts.

2. An impulse transmitter comprising inner and outer rotary dial mechanisms, said dial mechanisms coaxially aligned in spaced relation, a shaft operatively connecting said dial mechanisms together to provide a unitary structure, a finger-wheel having a single finger aperture therein, connected to said shaft, and in juxtaposition with respect to said outer dial mechanism, means associated with said dial mechanisms for causing them to operate simultaneously when said finger-wheel is rotated in a clockwise direction but permitting the outer dial mechanism to return to its normal position prior to the start of the run down of the inner dial mechanism, pulsing contacts operatively associated with said inner dial mechanism, a set of line terminals and means comprising electrical contact members operatively connected to said transmitter mechanism for establishing a connection to said line terminals for transmitting dial tone over a connecting line prior to the run down of the inner dial and the subsequent operation of said pulsing contacts.

References Cited in the file of this patent

UNITED STATES PATENTS

| | | |
|---|---|---|
| 2,368,104 | Beltrami | Jan. 30, 1945 |
| 2,375,179 | Shepherd | May 1, 1945 |

FOREIGN PATENTS

| | | |
|---|---|---|
| 484,843 | Germany | Oct. 22, 1929 |